United States Patent
Strassner

(10) Patent No.: US 8,195,827 B2
(45) Date of Patent: Jun. 5, 2012

(54) OBTAINING INFORMATION FROM DIFFERENT DEVICES IN A COMPUTER NETWORK

(75) Inventor: John Strassner, Colorado Springs, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/187,828

(22) Filed: Jul. 21, 2011

(65) Prior Publication Data

US 2011/0276666 A1    Nov. 10, 2011

Related U.S. Application Data

(62) Division of application No. 12/476,866, filed on Jun. 2, 2009, now Pat. No. 8,010,650, which is a division of application No. 10/662,038, filed on Sep. 12, 2003, now Pat. No. 7,558,847.

(60) Provisional application No. 60/410,707, filed on Sep. 13, 2002.

(51) Int. Cl.
*G06F 15/16* (2006.01)
(52) U.S. Cl. ........ 709/230; 709/203; 709/217; 709/220; 709/227; 709/246
(58) Field of Classification Search .................. 709/203, 709/220, 227, 230, 246
See application file for complete search history.

(56) References Cited

U.S. PATENT DOCUMENTS

| | | | | |
|---|---|---|---|---|
| 5,490,252 | A * | 2/1996 | Macera et al. | 709/249 |
| 5,608,874 | A * | 3/1997 | Ogawa et al. | 709/246 |
| 5,726,979 | A | 3/1998 | Henderson et al. | |
| 6,243,747 | B1 * | 6/2001 | Lewis et al. | 709/220 |
| 6,640,278 | B1 * | 10/2003 | Nolan et al. | 711/6 |
| 6,664,978 | B1 * | 12/2003 | Kekic et al. | 715/733 |
| 6,785,730 | B1 * | 8/2004 | Taylor | 709/230 |
| 7,092,968 | B1 | 8/2006 | Ebel et al. | |
| 7,558,847 | B2 * | 7/2009 | Strassner | 709/223 |
| 7,644,145 | B2 | 1/2010 | Rockwell | |
| 7,650,396 | B2 | 1/2010 | Tindal | |
| 7,894,357 | B2 * | 2/2011 | Purpura | 370/252 |
| 8,010,650 | B2 * | 8/2011 | Strassner | 709/223 |
| 2002/0087671 | A1 | 7/2002 | Weisser, Jr. et al. | |
| 2005/0119905 | A1 | 6/2005 | Wong et al. | |
| 2007/0002689 | A1 | 1/2007 | Mateescu et al. | |
| 2010/0146095 | A1 | 6/2010 | Strassner | |

* cited by examiner

*Primary Examiner* — Michael Won
(74) *Attorney, Agent, or Firm* — Stephen J. Walder, Jr.; Jeffrey S. LaBan

(57) ABSTRACT

Illustrative embodiments of the invention provide for obtaining information from different devices in a computer network. Data representing the information from each of the different devices is received, the data is in a specific form relating to each of the different devices. The data from each of the different devices is assigned to one or more entities as defined by an information model. The data from each of the different devices is grouped using an adaptation layer before assigning the data from that device to one or more entities.

20 Claims, 8 Drawing Sheets

OBTAINING INFORMATION FROM DIFFERENT DEVICES IN A COMPUTER NETWORK

PRIORITY

This application is a divisional of U.S. patent application Ser. No. 12/476,866, filed Jun. 2, 2009 now U.S. Pat. No. 8,010,650, which is a divisional application of U.S. patent application Ser. No. 10/662,038, filed on Sep. 12, 2003 now U.S. Pat. No. 7,558,847; which claims benefit of U.S. Provisional Patent Application No. 60/410,707, filed on Sep. 13, 2002; each of which is incorporated herein by reference in its entirety for all purposes.

RELATED APPLICATIONS

The present application is related to the following commonly-owned U.S. patent applications:

Ser. No. 09/942,834, entitled System and Method for Generating a Configuration Schema, filed Aug. 29, 2001;

Ser. No. 09/942,833, entitled System and Method for Modeling a Network Device's Configuration, filed Aug. 29, 2001;

Ser. No. 10/145,868, entitled System and Method for Transforming Configuration Commands, filed May 15, 2002;

Ser. No. 10/617,420, entitled Repository-Independent System and Method for Asset Management and Reconciliation, filed Jul. 10, 2003; and Ser. No. 10/213,958, entitled System and Method for Enabling Directory-Enabled Networking, filed Aug. 7, 2002; all of which are incorporated herein by reference in their entirety for all purposes.

FIELD OF THE INVENTION

The present invention relates to configuring and managing networked communication systems. In particular, but not by way of limitation, the present invention relates to systems and methods for using an information model to map between normalized representations of different network resources having different features.

BACKGROUND OF THE INVENTION

Networking architectures and network devices, such as routers and switches, as well as their configurations, are becoming increasingly complex both in structure and functionality. Such complexities require network engineers or other personnel to know hundreds or thousands of vendor-specific command or syntaxes and to master both the hardware and software idiosyncrasies of each differently manufactured networked device in order to successfully configure and manage a network. But traditional network management techniques, which include network device configuration and maintenance processes, fail to amply provide network administrators (or any network user) with a means to control the creation, the deployment, or the modification of each device configuration in a scalable and consistent manner.

Rather, network operators often configure devices without regard to any of the business processes affected by implemented configurations, which can lead to a disruption of network services. Without any mechanism for tying business processes and network management processes together, a newly applied configuration to a device just becomes a mere setting on a device. Consequently, the entire functionality of the configured device is not performed with business considerations prior to or after this configuration, which in turn, isolates the network processes from an organization's business processes. This hinders network efficiency. As most existing networking tools (e.g., provisioning tools) do not offer a view of the entire network, they typically offer only a limited view into, for example, an individual interface of a device.

The combined increase in network users and in sophistication of networked applications further militates integrating network management and business processes by establishing business rules that govern the usage of shared network resources. For example, a set of business rules can determine which user or network traffic has priority in using those shared network resources. But to control networking processes, each network resource's structure and functionality should be normalized to share and to reuse application data.

To normalize the structure and functionality of each network resource requires at least abstracting the resource's functionality. But abstracting resource functionality is difficult because most networks are built using different devices, each of which have many different capabilities and command syntaxes. Further, different vendors use different programming models for their vendor-specific network devices. The use of different programming models often leads to an inoperable or suboptimal networking of resources. For example, the use of varied programming models tends to impair a network operator's ability to determine whether a certain traffic conditioning used to separate different classes of traffic is correct.

FIG. 1 is a diagram showing network resources as sources of network information, each of which is associated with a different programming model. For example, a network portion 100 includes a first router manufactured by vendor one having a set of vendor-specific command line interface ("CLI") commands 102, a second router built by vendor two having another set of vendor-specific CLI commands 104, and one or more repositories of one or more Policy Information Bases ("PIBs") and/or Management Information Bases ("MIBs") 106. If FIG. 1 represents a portion of a conventional network, some routers support CLI 102 and 104 for provisioning while other routers employ Simple Network Management Protocol ("SNMP") for monitoring, which includes information from MIBs and PIBs 106.

Without an underlying uniform data representation 110 that relates the CLI commands to SNMP commands, it is in general impossible to correlate the commands of one programming model to the commands of another programming model. And since many network vendors build separate applications for managing different sets of features present in the same vendor-specific device, a minimum number of multiple applications are required to manage and to provision devices from not only different devices from different vendors, but also from the same vendor as well. An example of an instance where multiple applications are necessary is the case where two or more billing applications collect data differently and use different metrics to determine an amount that a network customer should be billed. This determination is complicated further if there are different devices supporting different proprietary MIBs to generate data, which are typically not in a suitable form for the billing applications to process.

Although present devices and techniques for managing networks are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention, in the Abstract, or in the Detailed Description. One skilled in the art can recognize that there are numerous modifications, equivalents, and alternative constructions that fall within the spirit and scope of the invention as expressed in the claims.

The present invention provides, among other things, a computerized method for managing a computer network, comprising forming a first representation of a network element as a physical entity in an information model, the first representation having a form independent of an implementation defined by a vendor; and mapping a portion of the first representation from the information model to a second representation in a vendor-independent data model residing in a first repository, the second representation having a form suitable for use with the first repository.

Another exemplary embodiment is a computerized method for obtaining information from different devices in a computer network, comprising receiving data representing the information from each of the different devices, wherein the data is in a specific form relating to each of the different devices; assigning the data from each of the different devices to one or more entities as defined by an information model; and grouping the data from each of the different devices using an adaptation layer before assigning the data from that device to one or more entities.

Another exemplary embodiment is a system for managing a computer network, comprising a processor; and a memory containing a plurality of program instructions configured to cause the processor to form a first representation of a network element as a physical entity in an information model, the first representation having a form independent of an implementation defined by a vendor; and map a portion of the first representation from the information model to a second representation in a vendor-independent data model residing in a first repository, the second representation having a form suitable for use with the first repository.

Yet another exemplary embodiment is a system for obtaining information from different devices in a computer network, comprising: a processor; a memory containing a plurality of program instructions configured to cause the processor to receive data representing the information from each of the different devices, wherein the data is in a specific form relating to each of the different devices; assign the data from each of the different devices to one or more entities as defined by an information model; and group the data from each of the different devices using an adaptation layer before assigning the data from that device to one or more entities.

These and other exemplary embodiments are described herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
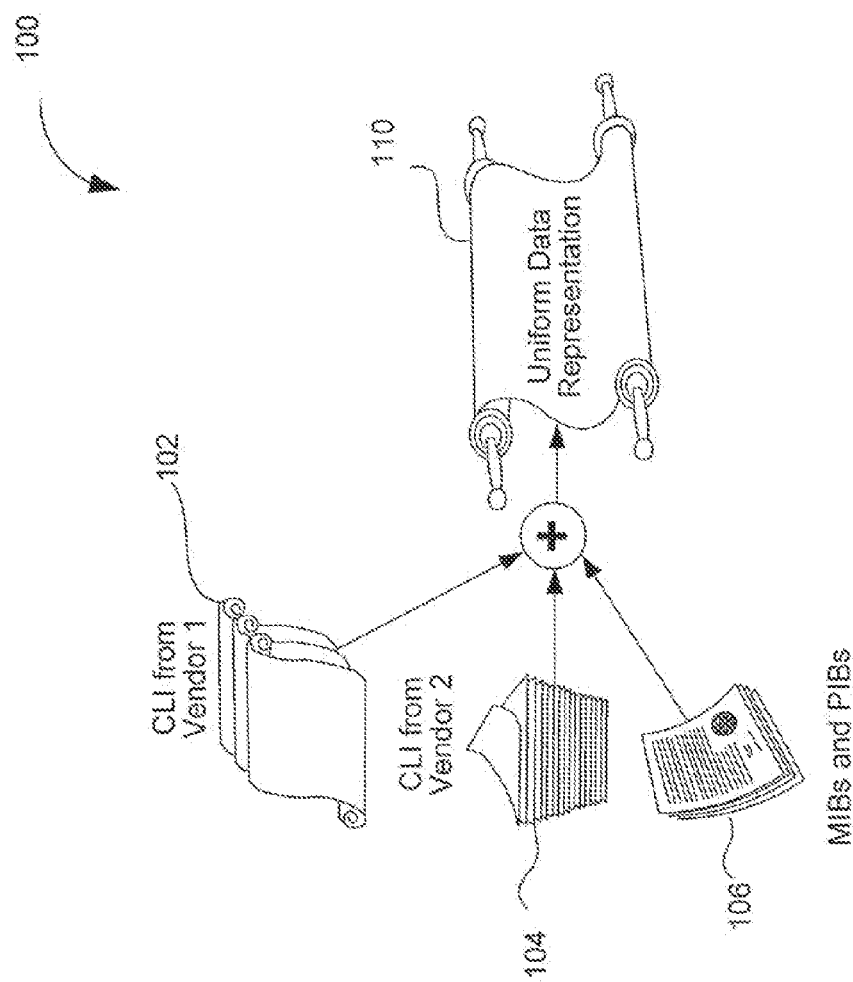
FIG. 1 is a diagram showing network resources as different sources of network information.

The present invention provides a system and a method for managing networks including one or more different devices having different command syntaxes, different programming models, and/or different functionalities. An exemplary system and method enables different network applications to share and exchange data for provisioning and managing network elements, for example. Among other things, the present invention facilitates the sharing and exchanging of data by using a normalized representation of network resources to, for example, map hardware and/or software features associated with at least one device to other hardware and/or software features of other, different devices. The normalized representations further enable similar functions in different devices to be equated regardless of having dissimilar hardware and/or software features, such as dissimilar command structures and implementations. Network resources generally include any network device, application, person, role, or any other element associated with a particular network.

The present invention provides an information model for representing different devices, including different programming models and/or different functionalities, as a common representation or abstraction, according to at least one embodiment of the present invention. In particular, different hardware features of a network device are normalized for representing the physical composition of dissimilar devices in a common way, such as by a data model, which enables mapping of equivalent physical capabilities of different devices. Further, by representing one or More physical characteristics of a device as, for example, an extensible representation of the physical characteristics (e.g., represented in XML), the associated logical functions of that device can also be related to logical functions of other different devices.

As described herein, an "information model" can refer to entities in a managed environment ("managed entities") that constitute a network, the interrelationships and behavior of such managed entities, and/or how data flows within the network in a manner that is independent of how the data is stored and retrieved in a repository. An information model therefore can include abstractions and can represent the various entities in a managed environment. Further, the information model can be used as a "dictionary" that defines different characteristics of managed entities and how those characteristics relate to each other. For example, an information model can be a data structure for organizing physical and logical information for describing the physical and logical characteristics of managed entities. This data structure can also be used to describe how other managed entities use and are related to specific physical and logical managed assets. By using an exemplary information model of the present invention, different networking products and applications can share and reuse information with which managed entities relate.

A "managed entity" can refer to any physical or logical entity that can be managed by a network operator, but need not represent only managed network devices. For example, a managed entity can also refer to routers, interfaces, routes, users, roles (e.g., as customer), applications, configuration settings, policies, statistics or to any other entity that directly or indirectly affects operation of a network device.

A "data model" can refer to any concrete representation of the information model that defines how data is stored, manipulated and/or retrieved using a specific type of repository and access protocol. A data model, which can include data structures, operations, rules, and the like, is analogous to the implementation of the data defined in an information model, but in a particular repository. "Mapping," as described herein can refer to model mapping, which is a translation from one type of model (e.g., data model) to another type of model. Model mapping changes the representation and/or level of abstraction used in one model to another representation and/or level of abstraction in another model. Model mapping can refer to a mapping from an information model to a data model. This type of mapping is usually exemplified through the mapping to a standards-based data model (i.e., a data model whose constructs are based on data structures and protocol elements defined in a standard). Model mapping can also refer to a mapping between different data models. This type of mapping is typified by optimizing a standards-based data model in order to take advantage of the features of a particular vendor implementation.

Further describing an embodiment of the present invention, different software features (e.g., traffic conditioning, etc.) that are implemented using different functions (e.g., different queuing algorithms, etc.) can also be normalized for representing logical characteristics in a common way, such as a single model. Such a common representation enables mapping of the same or equivalent functionality supported by two devices even though the mechanisms by which that functionality is supported are different. By representing logical characteristics in a common way, those different devices requiring a combination of commands to effectuate functionality in a manner similar to other devices requiring only a single command for performing a similar functionality. With a common representation, it becomes possible to coordinate the different commands of different devices to provide a common service.

According to a specific embodiment, different software features can be mapped onto different hardware to enable a network operator to design a network architecture that is independent of any one vendor's hardware and/or software implementation. Consequently, one or more hardware and/or software features, as "managed entities" of network devices, can be enabled or disabled through software regardless to whether an administrative model is different than a corresponding programming model. Thus, the administrative capabilities of a device can be abstracted into a common representation, so that the functionality of different devices can be managed and coordinated concurrently in accordance with business processes as defined, for example, by business rules.

Further to the present invention, some embodiments provide an exemplary information model that enables business rules to be translated into form that can be used to define network services, such as device configuration commands. Business rules can refer to one or more constraints using, configuring, monitoring and/or managing network devices, such as by the type of user, the time of day a service is requested, the users authorized to implement a network configuration, etc. Notably, some device command syntaxes and programming models for device configuration may not be suitable for integration with business rules.

An exemplary information model can also be used with a set of policies to be integrated with the representations of the business rules and the other managed entities according to the present invention. The policies are defined, and represented, at a different level of abstraction than the business rules and managed entities (e.g., network commands). This enables policies to be built to proactively monitor network services and adjust, for example, the corresponding configurations of managed entities to ensure that the business processes of a particular service is met by the devices providing those services. The term "service" refers generally to a functionality of a network that can be provisioned for a customer, such as a VPN service. The term "policy" refers generally to a set of rules that are used to manage and control the changing and/or maintaining of the state of one or more managed entities as objects.

Figure 2:
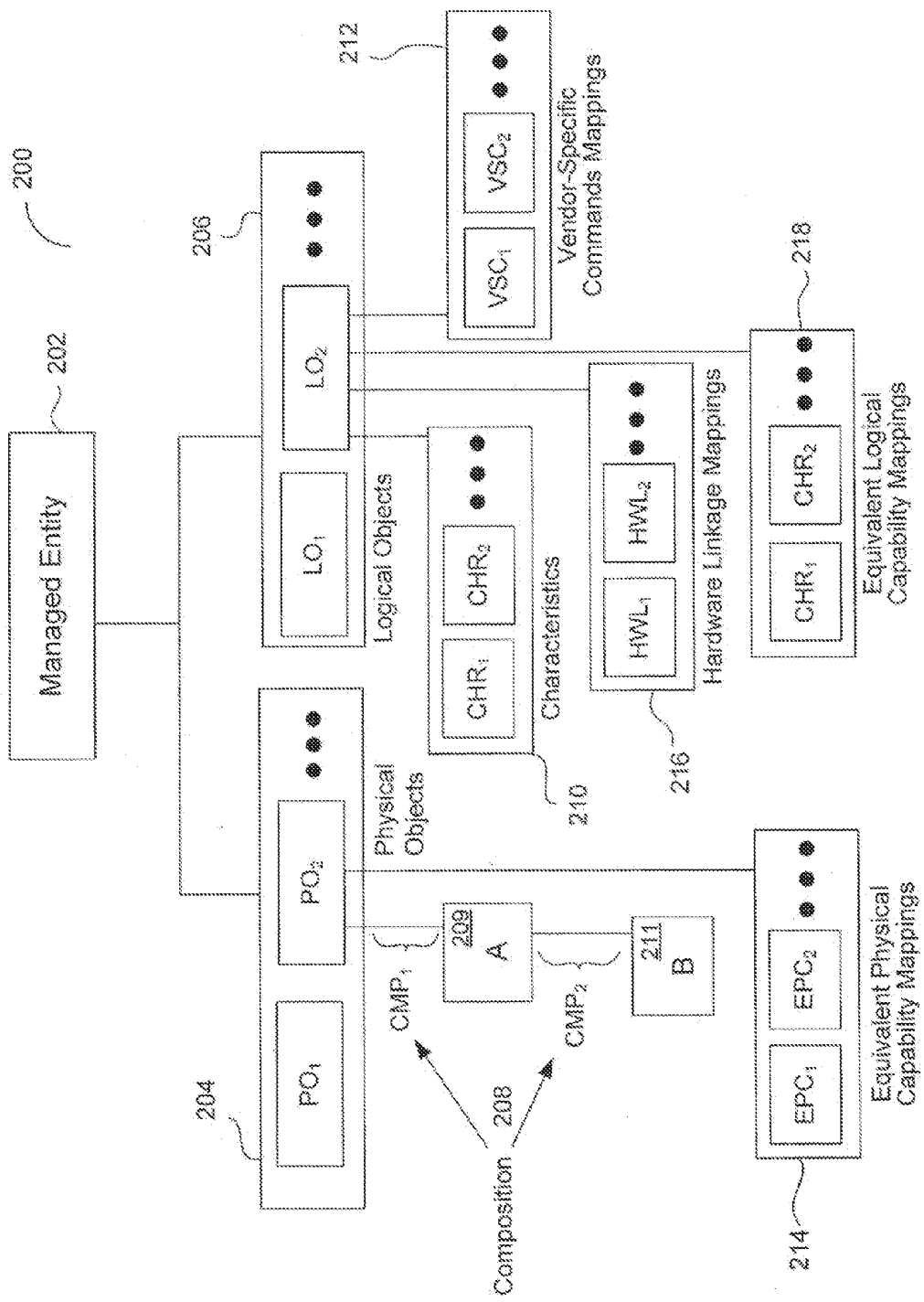
FIG. 2 illustrates an exemplary managed entity in accordance with an embodiment of the present invention.
Figure 3:
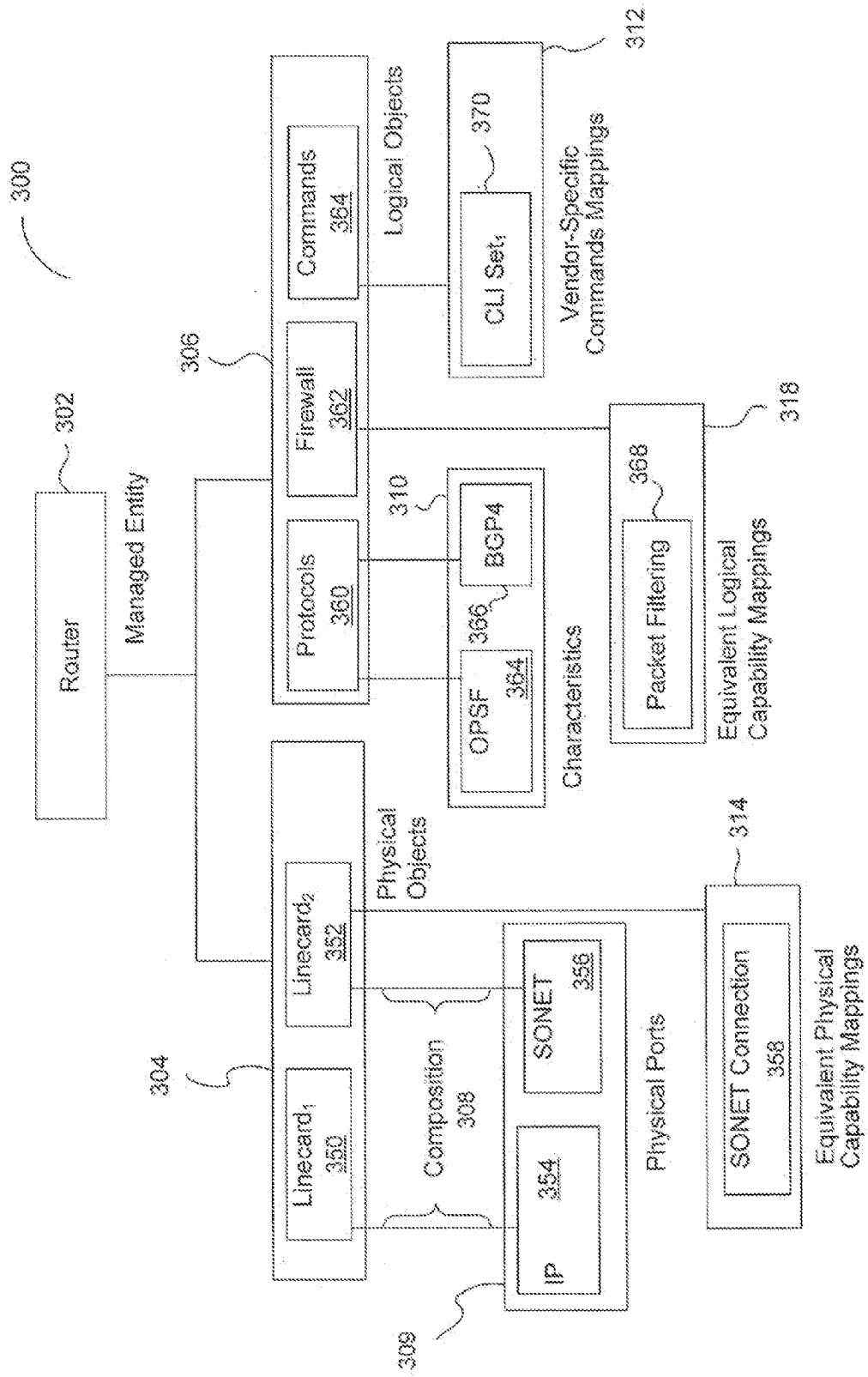
FIG. 3 is an exemplary managed entity representing a router in accordance with one embodiment of the present invention.

Referring now to the drawings, where like or similar elements are designated with identical reference numerals throughout the several views. In particular, FIG. 2 illustrates an exemplary representation of a managed entity according to one embodiment of the present invention. For example, managed entity 202 of representation 200 can be defined as an object-oriented representation of any entity that can be managed in a network system. As an example of a managed entity, FIG. 3 illustrates a router as managed entity 202 of FIG. 2.

According to one embodiment, an exemplary information model with which managed entity 202 relates is an object-oriented information model. This information model uses a set of object-oriented classes and relationships to describe one or more of the following: the physical composition of devices, the logical characteristics of devices, a set of mappings between a logical feature and each of the physical entities (e.g., devices) that supports the logical feature, a set of mappings between a logical feature and the specific commands that a particular device employs to support that feature, and like information and/or data for managing and configuring a network in accordance with the present invention. Note in particular that such representations are inherently extensible, as they can be constructed using separate managed entities to represent each of the above sets of functionality.

In one embodiment, each managed entity can be represented by a data model to represent all or some information that describes that managed entity. In another embodiment, a larger data model can represent many managed entities. In yet another embodiment, more or fewer of the foregoing features can constitute a managed entity in accordance with the present invention.

Managed entity 202 of FIG. 2 is shown as being represented by either physical objects 204 or logical objects 206, or both. Physical objects 204 can include one or more physical objects "$PO_1$," "$PO_2$," etc. to describe the physical entities, and logical characteristics 206 can include one or more logical objects "$LO_1$," "$LO_2$," etc. that describe the logical entities of managed entity 202. Alternatively, physical objects 204 and/or logical objects 206 can be related to no objects to describe either physical or logical entities. Although representation 200 is shown as hierarchical tree structure comprising nodes having parent-child relationships, representation 200 can be represented as layered model of layered class hierarchies. The layered class of hierarchies enables an information model to be used to represent appropriate amounts of detail for one or more of the different aspects of an object representing a managed entity. The different hierarchies of representation 200 and relationships among the elements of representation 200 can be related with associations, aggregations, compositions and the like. One having ordinary skill in the art will appreciate that FIG. 2 is but an example of how the elements constituting a managed entity can be described and related. That is, the elements and relationships depicted in FIG. 2 are exemplary and are not intended to be inclusive (e.g., interrelationships can exist between sibling nodes of the same managed entity or among nodes of other managed entities). For example, there can be a number more categories of physical objects and relationships constituting managed entity 202 than those shown in FIG. 2.

Physical objects 204 can describe the physical composition of managed entity 202 as a set of object-oriented classes. As shown in FIG. 2, physical objects 204 can include one or more physical objects "$PO_1$," "$PO_2$," etc. to describe the physical entities required by managed entity 202 to accomplish a specific management task. Further, each of physical objects 204 can be described by additional managed objects that are related to each other, where these managed objects can be associated with physical and/or logical entities. A particular type of relationship between managed objects can be represented as a composition 208.

For example, consider a line card having a physical port, where that port is related to an IP address. Then, the line card can be represented by object "$PO_2$," the physical port can be represented by "object A" 209 (i.e., as a physical object), and the IP address can be represented by "object B" 211 (i.e., as a logical object). The relationships between these objects can be described as composition(s) 208. In particular, "$CMP_1$" and "$CMP_2$" describe respectively, as compositions, the relationship between $PO_2$ and object A and the relationship between object A and object B. In this example, $CMP_1$ relates the physical port to the line card and $CMP_2$ relates the IP address to the physical port. Thus, composition(s) 208 enable the lifecycles of the physical port and IP address to be represented as a function of the life cycle of the line card (i.e., the physical port cannot exist without its parent line card; if the card is removed from the network, the associated physical port and its associated IP address "disappear," or are disassociated with the network).

Thus, by using relationships, such as compositions 208 and others not shown in FIG. 2, a detailed understanding of the physical structure of managed entity 202 can be developed for a number of network-related tasks, such as managing physical inventory. For example, the management of physical inventory can be facilitated by a "view" of the physical inventory, where a view, as described herein, refers generally to collated entities that are applicable for understanding a particular perspective. One method for managing physical inventory (i.e., managing "stranded assets") is described in U.S. patent application Ser. No. 10/617,420, entitled Repository-Independent System and Method for Asset Management and Reconciliation, filed Jul. 10, 2003 and assigned to an assignee in common with the subject application.

In addition, each of physical objects 204 can be associated with one or more equivalent physical capability mappings 214 ("$EPC_1$," "$EPC_2$," etc.) for determining equivalent physical compositions for constituting managed entity 202. In particular, these mappings define equivalent physical capabilities between different devices for relating the different hardware capabilities of each device to each other. With equivalent physical capabilities associated with managed entity 202, different devices that are required to work together can be identified to implement a common function of managed entity 202 regardless of whether the common functionality requires different hardware. With these similar physical capabilities identified and represented independent of any specific vendor, equivalent physical capability mappings 214 can prevent physical mismatches and are useful in programming (e.g., establishing) a service that spans multiple physical devices. For example, a given line card manufactured by vendor "A" may have eight physical ports of a given type (e.g., "Ethernet"), whereas a different line card manufactured by vendor "B" may only have four physical ports of that same type (e.g., Ethernet). That is, vendor B's cards only have half the number of ports that vendor A's cards have. Thus, any two devices would have the equivalent physical capabilities if using either "L" number of vendor A line cards or "2*L" number of vendor B's equivalent line cards.

Logical objects 206 can describe the logical characteristics of managed entity 202 as a set of object-oriented classes. As shown in FIG. 2, logical objects 206 can include one or more logical objects "$LO_1$," "$LO_2$," etc. to describe the logical entities required by managed entity 202 to accomplish a specific network-related task (e.g., managing and provisioning). Further, each of logical objects 206 can be described by its logical characteristics 210, such as "$CHR_1$," "$CHR_2$," etc., that constitutes the logical entities of managed entity 202, which provide a vendor independent view of logical device capabilities. Using logical characteristics 210, a detailed understanding of the functionality of managed entity 202 can be used for a number of network-related tasks, such as modeling logical features (e.g., interfaces, software, etc.) of or relating to a device. By modeling the functions that a network device provides, then that device can easily be identified and implemented to establish a service that requires support by that device and its functionality. For example, if a device is required to be used to implement a virtual private network ("VPN") and the device's logical entities (e.g., features and functionalities) are modeled to provide a function or feature of the VPN, then the modeled role of the device in implementing the VPN can be selected and provisioned to enable that particular service.

In addition, each of logical objects 206 can be associated with one or more equivalent logical capability mappings 218 ("$ELC_1$," "$ELC_2$," etc.) for determining equivalent logical capabilities or features for constituting managed entity 202. These mappings define how different logical capabilities of each network device relate to each other independent of any particular vendor. In particular, these mappings can define equivalent logical capabilities (i.e., functionalities) between different devices as well as equivalent logical capabilities between different features of different device implementations. With equivalent logical capabilities associated with managed 202, different devices that are required to work together can be identified to implement a common function of managed entity 202 regardless of whether the common functionality requires, for example, different software capabilities. Some examples of logical capabilities that can be modeled are different commands, differently supported protocols, different operating systems, and other like logical dissimilarities.

Hardware linkage mappings 216 include a set of mappings that define linkages of logical features associated with one of logical objects 206 to physical entities (e.g., hardware) to support those logical features. These mappings enable the identification of hardware to implement a particular logical feature. For example, hardware linkage mappings 216 can be used to determine whether hardware exists to support a desired logical feature, whether any physical capacity is available for use to support enabling an implemented service, whether a particular feature can be run at a given line rate, and other like information related to physical entities providing logical features. In other words, hardware linkage mappings 216 enable the logical capabilities of a device to be bound to existing physical hardware for implementing a common functionality using specifically identified physical hardware, as an example.

Vendor-specific commands mappings 212 include a set of mappings that define relationships among different logical features and the vendor-specific commands required to implement that logical feature. In particular, the same command can be mapped to a different combination of vendor-specific features (e.g., commands or syntaxes). Consider a network formed using heterogeneous devices (i.e., different devices from different vendors), each of which can be employed to realize high-level concepts such as the ability to run a particular protocol, to forward traffic, and the like, where these abilities are generally implemented using different commands and/or features. In accordance with at least one embodiment of the present invention, commands of different devices can be abstracted as a set of capabilities that can either be bound to available hardware, or can be mapped to higher-level services, or both. This enables a scalable network management system for provisioning end-to-end services independent of any specific vendor.

FIG. 3 is an exemplary managed entity representing a router. According to an embodiment of the present invention, a router can be represented by a set of data models that represent physical and logical device information that each describes one or more managed entities. In general, each data model can represent all or some information that describes a particular managed entity. For example, a router can be associated with physical information (e.g., the set of line cards that are installed in the router) as well as logical information (e.g., protocols that are running on each of its interfaces). Other exemplary logical information can include protocol information, service information (e.g., connectivity using a VPN), statistical information (e.g., data describing how well a service is running), ownership information (e.g., who owns the device, who is responsible for changing the device), security information, and other like information.

As shown, managed entity representation 300 describes router 302 including physical objects 304 and logical objects 306. Here, physical objects 304 include two line cards as objects 350 ("Linecard$_1$") and 352 ("Linecard$_2$"). For objects 350 and 352, the logical connectivity of router 302 is respectively represented by IP 354 and SONET 356, both of which have their respective relationships to line cards 350 and 352 described as composition(s) 308. Both IP 354 and SONET 356 can be physical ports 309, as an example, and are represented as physical objects. In this instance IP 354 is a line card for providing IP capabilities and SONET 356 is a line card for providing SONET capabilities. As shown, Linecard$_2$ 352 is associated with another equivalent physical capability 314 and includes as mapping 358 to another line card ("SONET connection") for providing SONET capabilities. Notably, line cards 350 and 352 each can also be represented as managed entity 202 of FIG. 2 for providing a common representation in a vendor-independent format.

Logical objects 306 can include a number of logical capabilities, such as certain functionalities (e.g., firewall-like functions), features (e.g., protocols), etc. As shown, logical objects 306 include logical objects "protocols" 360, "firewall" 362, and "commands" 364. In this instance, protocol 360 includes logical characteristics 310 as "OPSF" 364 and "BGP4" 366 as protocols, or logical features, of router 302. Firewall 362 is associated with an equivalent logical capability mapping 318, which maps to a "packet-filtering" 368 functionality as a similar logical capability that router 302 can perform. Thus, router 302 can be identified as being able to provide firewall functionality, if a service (e.g., VPN) is to be implemented with that function. Notably, protocols 360, firewall 362, and commands 364 each can also be represented as managed entity 202 of FIG. 2 for providing a common representation in a vendor-independent format.

Router 302 is also shown to be associated with a certain set of commands as commands object 364. Here, CLI set one 370 can include a variety of mappings for implementing vendor-specific commands. Hence, router 302 can be managed and/or provisioned with a normalized set of commands using these mappings. FIG. 3 is only an exemplary representation; additional logical and physical capabilities can be further represented in FIG. 3, such as which of the line cards have available ports (i.e., via hardware linkage mapping 216 of FIG. 2), which of those ports are congested as described by statistical information, and other like capabilities. One having ordinary skill in the art should appreciate that the physical and/or logical capabilities of router 302 can be represented as one or more sets of managed entities 202 of FIG. 2.

An exemplary information model of the present invention uses common representations of various managed entities, such as shown in FIGS. 2 and 3 to normalize physical and logical entities of a network by performing mapping translations from current programming models to vendor-independent data models (i.e., independent of implementation technology). The information model is used to define how different characteristics of the managed entities should be mapped as well as what form it should take in the vendor-independent data models. To perform mapping translations in accordance with an embodiment of the present invention, there are "n" sets of mappings from the information model to a vendor-independent data model stored in one or more repositories (in a form appropriate to each of the repositories). The "n" sets of mappings are the number of relevant data models, where each mapping to a unique repository is due to at least different access protocols, storage structures, and/or other characteristics that differentiate its implementation. In at least one embodiment, one repository is a directory and another repository is a relational database, or any other known database.

Optionally, there may be additional "m" sets of mappings, each of which results in a mapping of a data model (e.g., stored in a repository) to a vendor-specific (i.e., optimized) implementation, such as one or more different "m" number implementation for each vendor-specific product. Each of the "m" sets of mappings is used because different vendors and physical entities implement the same features (e.g., software, commands, etc.) differently as well as the functions performed. As such, a single mapping can exist from an information model to a data model stored in a specialized form for a given type of repository. But many mappings may exist to map from the specialized form of the data model to implement different vendor's commercial products of the repository.

For example, different implementations of different types of repositories generally have very different functional differences between them, such as the case with directory servers and relational databases. In each case, there is an underlying standard (e.g., "LDAP" and "SQL") that serves as an access protocol, which governs how information is stored to and retrieved from the repository. Yet, in each case, vendors generally have implemented part, but not all, of a standard. In some cases, other vendors have added their own extensions, or alternatively, have not implemented everything in the standard. Thus, each case requires one or more mappings from repositories implementing a standard to the vendor-specific implementation in order to leverage the vendor-specific implementation.

Figure 4:
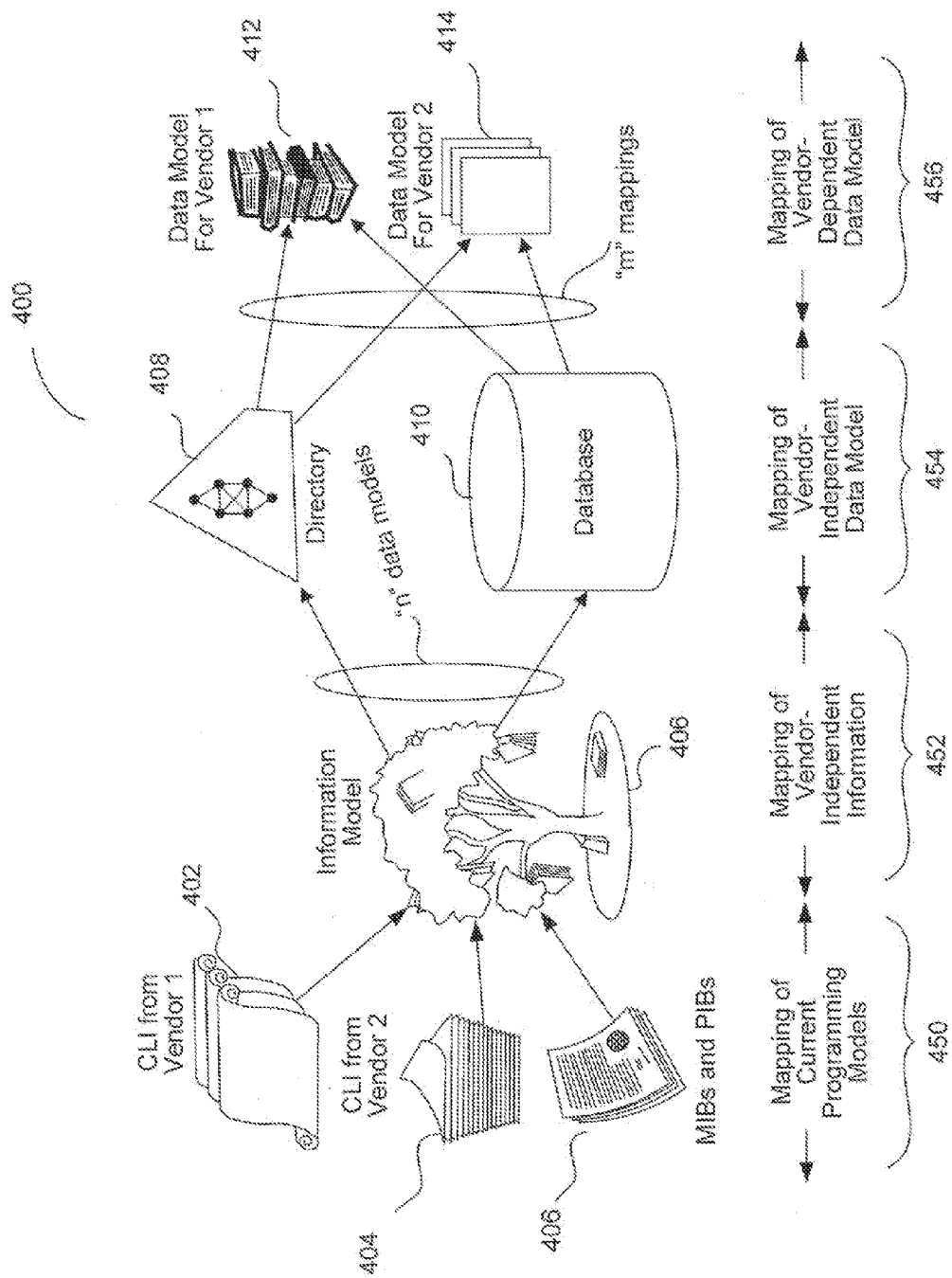
FIG. 4 illustrates one method of performing mapping translations using an exemplary information model in accordance with one embodiment of the present invention.

FIG. 4 illustrates one method of performing mapping translations using an exemplary information model in accordance with one embodiment of the present invention. Although FIG. 4 depicts only one information model 406, other embodiments of the present invention can include multiple information models 406. In embodiments using multiple information models, a method similarly represented in FIG. 4 can ensure that each managed entity is represented in the same, common manner among all of the multiple information models by using a data dictionary to validate data coherency.

As shown in FIG. 4, characteristics of different devices (i.e., physically and/or logically), such as one or more programming models, are first incorporated at 450 into a common representation of information model 406. In this example, information from sources CLI 402 and 404, and from MIBs and PIBs 406, which use SNMP, are synthesized from different programming models into a common representation associated with relevant physical and logical entities.

Exemplary information model 406 at 452 abstracts the data used by vendor-specific programming models into vendor-independent (and technology-independent) data models by, for example, using definitions for the managed entities' devices and relationships (i.e., physical and logical). Information model 406 is a federated model and therefore is used to process information from any source necessary for practicing the present invention. Notably, information model 406 contains defines concepts, such as CLI, MIBs, and the like, as well as other means of managing devices in its structure. For example, information model 406 provides common information for defining a higher-level abstraction layer. A higher-level abstraction layer can be used to incorporate the data required by different vendor-specific programming models, and to relate these data to different business, system, and implementation entities, which in turn are used to represent the managed environment. This provides for a common definition for attributes, methods, and relationships of entities to be managed. It also provides a set of synonyms, source of material, and other essential information so that designers can better understand and use the model. Information model 406 can also include a set of business and system models for specific knowledge domains (e.g., service, resource, customer, etc.), where the concept of knowledge domains is discussed below.

Figure 5A:
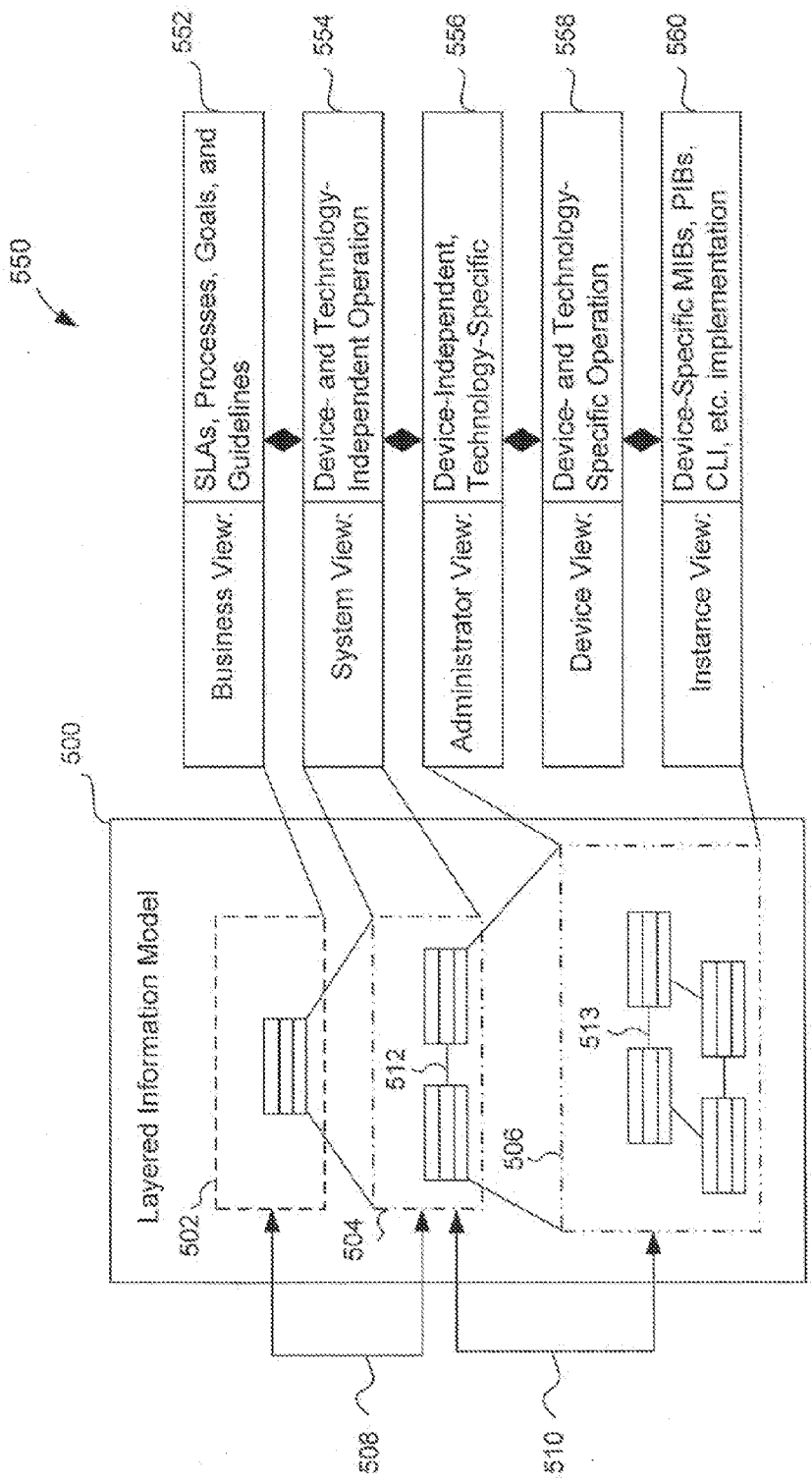
FIG. 5A is an exemplary information model represented as a layered information model according to one embodiment of the present invention.

FIG. 5A is an exemplary information model represented as a set of layered information sub-models according to one embodiment of the present invention. Each layer of information model 500 includes a set of objects that are common to that layer, where each layer represents a different level of abstraction. Further, each layer can be a way of organizing information such that the information can be classified as knowledge (e.g., with respect to a particular knowledge domain). Moreover, each of the layers is related to each other using appropriate relationships (e.g., associations, aggregations, compositions, and other like relationships). As an example, entities associated with lower layers of information model 500 can "inherit" characteristics of entities defined in its higher layers. As such, different programming models of the same device (or device feature) can be integrated and/or correlated with each other. Hence, different features that are prone to change (relative to other features associated with a network) can be isolated from each other. This allows specific feature changes in a device model (e.g., software revisions, as they are generally prone to change) to be easily accommodated by the network and by the business processes, depending upon those feature changes. And it also enables features that are prone to change to be separately modeled.

As shown in FIG. 5A, layer 502 includes one or more objects that, for example, are defined in a business view of the managed environment. The business view includes a set of business-oriented representations (e.g., using objects) for implementing business processes, guidelines and goals. These representations are generally designed for business entities, such as customers, service, service level agreements (SLA), or other users that need not be exposed to the system level abstraction. For example, a customer is not particularly interested in learning what system-level requirements are necessary to provide a service, such as the settings of a particular internal gateway protocol ("IGP") for routing or the protocols for establishing a VPN service, at the business level. Layer 502 is related via relationship 508 to layer 504.

In one embodiment, relationship 508 is a mapping (or a translation) from one business-oriented representation to two system-oriented representations (i.e., two system-level objects) having a relationship 512 between these two system-level objects.

In this instance, layer 504 includes two objects that, for example, provide a system view. The System view includes a set of system-oriented representation (e.g., objects associated with system view 554) of a level of detail for managing the business processes, such as what type of VPN is necessary for implementation. These representations are generally designed for users that need not be exposed to the technology-specific aspects of a system-level abstraction. In particular, abstractions at this level and translations with this level are generic in nature and avoid choosing a specific technology such as Differentiated Services ("DiffServ") or a specific implementation (e.g., IOS CLI over Telnet).

Further to the example shown in FIG. 5A, relationship 510 is a mapping from the system-oriented representations to four implementation-oriented representations (i.e., four system-level objects) interrelated by relationships 514 among the four implementation-level objects. Here, layer 506 includes four objects. As an example, these objects can include administrator-related representations (i.e., associated with administrator view 556) used to map to technology-specific implementations from the system level. As another example, these objects can include device-related representations (i.e., associated with device view 558) for mapping a selected implementation into a form that is appropriate for a specific type of device. In addition, these objects can include instance-related representations (i.e. associated with instance view 560) to map that specific type of device to a configuration that takes into account the specific software versions, memory configuration; and other factors ancillary to the functionality of the device.

As shown in FIG. 5A, each of the different "views" 550 is associated with a different level of abstraction. Views 550 can describe one or more policies that can be applied to the information model layers to determine the specificities of translating business needs of an organization into a particular device configuration. And the application of a specific set of policies is tailored to the needs of different domains (i.e., "knowledge domains") of users as well as services and devices, for example. These sets of policies for each of views 550 bind the different views, such as the business-oriented, system-oriented, and implementation-oriented views, to the different levels of the information model 500. In one embodiment, views 550 (i.e., business view 552, system view 554, administrator view 556, device view 558, instance view 560, or other views, if applicable) each represent a different knowledge domain. In this case, each of the knowledge domains can be further subdivided. For example, the business view can include "product-specific" views, "customer-specific" views, "marketing/sales-specific" views, and the like. In other embodiments, views 550 can represent other entities, which can be described where view 552 is a first layer, view 554 is a second layer, view 556 is a third layer, view 558 is a fourth layer, and view 560 is a fifth layer.

As described herein, a "knowledge domain" refers to a classification of knowledge, such as the knowledge for describing a device, a product, a service or the like. Knowledge domains can be formed to reflect how information is classified and organized. Knowledge domains can be used to split apart a large number of management entities for organizing them into related sets of entities. They also serve to define how the modeling activity is performed. For example, by defining separate knowledge domains for a "product" and a "service," specialists in each area can work on each area independently as well as concurrently, and in a manner adapted to each of the specialists' area of expertise. For example, a knowledge domain can represent one or more sets of entities that pertain to a particular area (e.g., service or product). Behavior is represented, in part, by relating different entities to each other. These relationships can be within a specific knowledge domain or among entities in multiple knowledge domains. Although it is generally common to relate entities within a specific knowledge domain to each other (because there is already some inherent relationship between entities of a particular domain), entities of one knowledge domain can also be related to other entities in other knowledge domains.

Figure 5B:
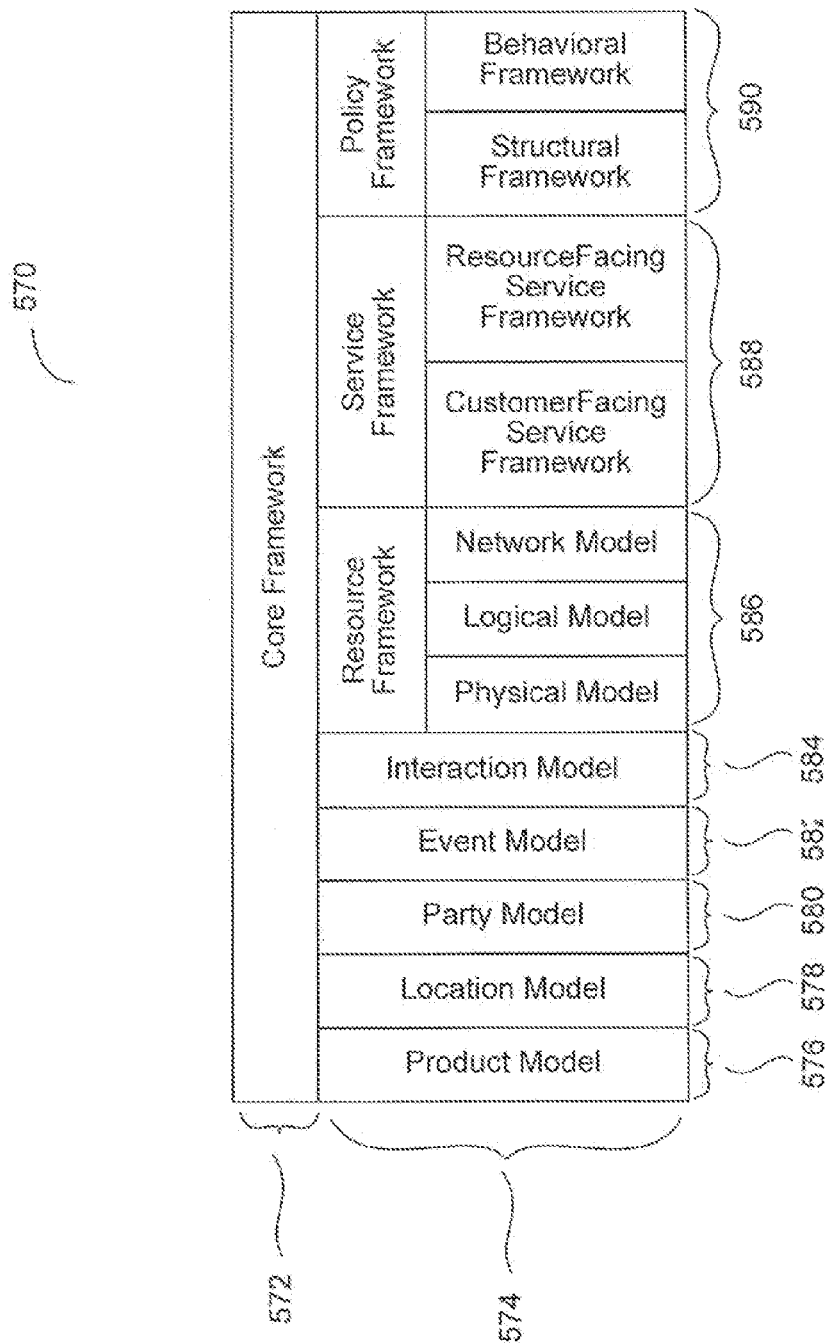
FIG. 5B is another representation of the exemplary information model of FIG. 5A, according to a specific embodiment of the present invention.

FIG. 5B is another representation of the exemplary information model of FIG. 5A, which is shown as a layered, next generation directory enabled network ("DEN-ng") information model according to a specific embodiment of the present invention. Exemplary information model 570 includes a core framework 572 and knowledge domains 574. Core framework 572 is the highest layer in the DEN-ng information model and contains high-level entities and relationships that enable more specific domain models 574 to be integrated into a single cohesive model. As shown in FIG. 5B, knowledge domains 574 include product model 576, location model 578, party model 580, event model 582, interaction model 584, service framework 588, resource framework 586, and policy framework 590. Each of these models have multiple layers that define multiple levels of abstraction, such as shown in FIG. 5A, that is used to organize information in a given knowledge domain. Further to this example, service framework 588, resource framework 586, and policy framework 590 can provide additional abstractions for representing concepts applicable to the entities in these domains. That is, service framework 588 can include a physical, a logical and a network model, resource framework 586 can include a resource-facing and a customer-facing service framework, and policy framework 590 can include a behavioral and a structural framework. It should be again noted that FIGS. 5A and 5B are exemplary in nature, and should not be construed to be limiting in any way.

Referring back to FIG. 4, after a common representation is defined by information model 406, that representation can be translated into one or more data models. Data models can be built by translating the information describing one or more managed entities (i.e., objects) represented in an information model to one or more managed entities (i.e., objects) represented in a specific data model. These translations can be built by, for example, developing a set of rules that translate information at one level of abstraction (i.e., one layer) to data at a different level of abstraction (i.e., at another layer, such as a higher layer). In this example, FIG. 4 shows two such translations; one translation to one or more data models stored in directory 408 and another translation to one or more data models in database 410.

Although directory 408 and database 410 are shown as repositories, additional types of repositories are within the scope of the present invention. For example, two or more additional repositories, that could take the place of either directory 408 or database 410, generally have different capabilities, such as different access protocols and different ways of storing data. These different repositories can each require one or more data models, where each data model contains at least the information mapped from information model 406 into a vendor-independent form that represents standards-based ways of storing and retrieving data from each type of repository. While standards exist for representing, querying, and manipulating data in different repositories, vendor implementations using that data are non-standard. Repository standards can be referred to as Repository Data Specifications ("RDS"). Specifically, vendors routinely add functionality to a repository beyond the requirements of an RDS, or, alternatively, vendors do not implement all of the functions specified by an RDS. Further, multiple vendors implement the same function in their devices in different ways. For at least these reasons, a preliminary vendor-independent repository model is required to serve as a normalization layer between the data in the form of an information model and the information that will be stored in and/or retrieved from a repository (which usually is in the form of a vendor-independent data model).

The mapping of vendor-independent data model 454 includes a set of mappings that transform data represented in a common representation in information model 406 to a form that can be implemented in a particular type of repository, such as in database 410. Thus, an object that is represented in the information model may be represented differently in each data model in each different repository. See FIG. 7 and the discussion relating thereto, as an example. This is because each data model has a specific set of capabilities and restrictions in representing information, which can include one or more access protocol(s) being used.

Examples of a multiple access protocols used on a repository are SQL92, vendor-specific SQL, and/or ODBC (as used with RDBMSs, or relational database management systems). Other data model capabilities can include the manner in which data is stored and organized, how relationships between objects are implemented, and whether a given type of repository has specific facilities, such as for implementing metadata and behavior as specified in the information model. In one embodiment, these and other repository-dependent features form a "mapping vector" that prescribes how data is to be represented in a particular information model. This in effect restricts what subset data from the common information model can be represented, and determine how those data are represented. For example, directories such as directory 408 of FIG. 4 have much more limited forms of locating information than do relational databases such as database 410. Furthermore, directories tend to use different protocols than do relational databases. This means that some information that can be easily represented in a RDBMS cannot be easily (if at all) represented in a directory. The mapping vector serves to define how information in a data model can be translated to a form that can be stored and retrieved using the native facilities of a particular type of repository.

After a common vendor-independent repository data model is built at 454 using information model 406, then the appropriate portions of that common information can be transformed into a repository-specific implementation at 456. Note that at 454, the information model transforms the data into a form that is suitable for implementation using a particular type of data model. This transformation is vendor-independent, and therefore generic-like, in nature. Therefore, the transformed data can be viewed as being in a "repository-standard" form of the data. But most applications require an "optimized" implementation, rather than the generic implementation. An optimized implementation can refer to a further mapping of vendor-dependent features and the like at 456.

Optionally, at 456 a different "mapping vector" can be applied to the repository-standard form of the data stored, for example, in data model of database 410 to again transform the repository-standard (but vendor-independent) form of the data into a vendor-specific implementation of that repository. For example, consider that a vendor-independent data model of database 410 is mapped to two vendor-dependent data models, as shown as "data model of vendor 1" 412 and "data model of vendor 2" 414. Each of these two data models can be in specific repositories for providing an optimized functionality.

For example, consider the modeling of a device interface as a data model in database 410. This interface may be described using a number of different programming models, such as using CLI rather than using SNMP. But suppose determining that a particular piece of information, such as the number of packets dropped per unit of time, is desired. Information model 500 and 570 of FIGS. 5A and 5B, respectively, can represent this information in a repository-independent form. However, the acquisition of the piece of information, in code, requires selecting a particular type of repository. Because the frequency of change of this attribute is very high (relative to other entities), direct storage in certain types of repositories, such as a directory, is suboptimal. Consequently, a repository such as database 410 is more suitable for storing such information. As another example, consider the modeling of a user as a data model in database 410. Suppose that this entity has an attribute that contains the "Employee ID" of the user. This attribute likely does not change frequently during the time of employment of the user, and thus is suitable for storing a relevant data model in directory 408.

In another embodiment of the present invention, an exemplary information model can be further configured to facilitate collecting, correlating, and integrating different types of information describing one or more features of a device from different sources. Such an exemplary information model can be configured to be structured to perform functionalities of other embodiments, but also can relate data in many diverse data formats, which are typically supplied from different information sources in a normalized fashion. Normally, different types of statistics and performance information are gathered by different means without a normalized technique for correlating that information from each of the different devices.

For example, a MIB variable defining the packet drop rate of an interface can be generally obtained using traditional SNMP polling mechanisms. Further, consider that statistic data is generated to define the current number of active users. If a network operator desires to fine-tune a network to ensure that each of the active users receives the service for which it has contracted (e.g., without violating a particular SLA), then the network operator requires information that represents the actual, current service level for comparison with the contracted levels of the SLA. As the rate of packet loss can be indicative of an upcoming SLA violation, a network operation will seek to normalize the diversely formatted data, which are being supplied from different information sources, for determining how best to provide guaranteed service levels over differing rates of packet loss and numbers of active users. The exemplary information model of at least this embodiment can be employed to assist in management of network performance such as described above.

Figure 6:
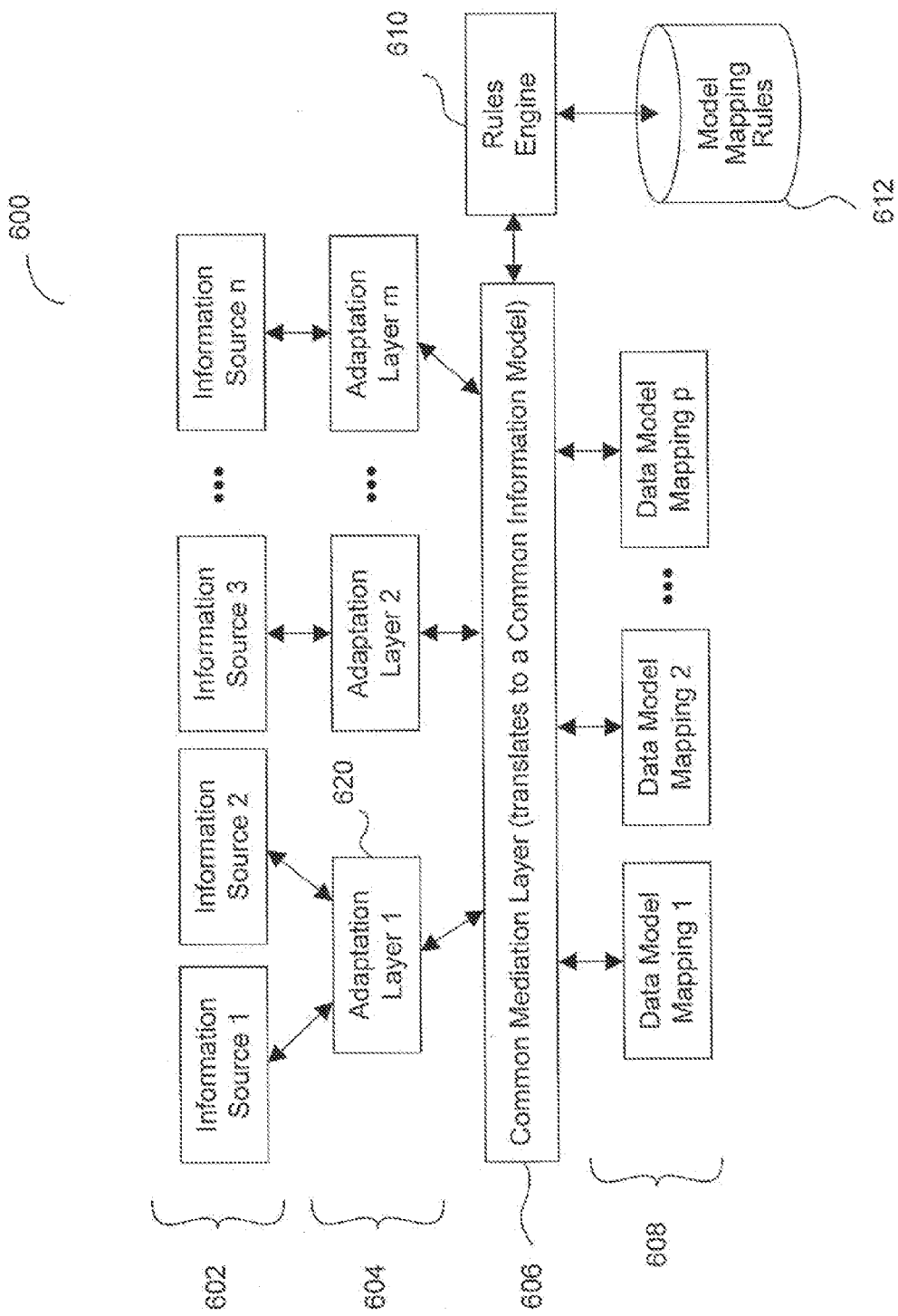
FIG. 6 illustrates a system for using an exemplary information model to facilitate the collection, correlation, and integration of different types of information according to one embodiment of the present invention.

FIG. 6 illustrates a system for using an exemplary information model to facilitate the collection, correlation, and integration of different types of information describing one or more features of a device from different sources. in this example, system 600 includes one to "n" information sources 602. Information sources 602 are different devices having different command syntaxes, different programming models, and/or different functionalities, such as information sources CLI 402 and 404 and from MIBs and PIBs 406 of FIG. 4. System 600 also includes a common media layer 606 coupled to each of data model mappings 608, which can be equivalent to data models stored in repositories, such as database 410 for FIG. 4. Common media layer 606 is coupled to receive via rules engine 610 model mapping rules from database 612. Note that "n" and "m" of FIG. 6 are used to describe features in connection with this figure only; they do not relate to "n" and "m" as defined in other figures described herein.

Common mediation layer 606 operates to preserve the semantics of received information (e.g., serves as a "glue" layer), but transforms the received information into a common representation and format for integration with other common information in the exemplary information model. Through the use of common mediation layer 606, additional parts of the information model need only be specified, or built, on an "as-needed" basis, thus avoiding building a complete information model that generally contains many or all pre-defined entity (i.e., physical and/or logical) and behavior (i.e., functionality) for mapping to any of the specific data models 608. This enables portions of an overall network architecture to be designed without having to wait for the entire exemplary information model to be completed before it is available for use.

In operation, information (e.g., performance information from MIBs) received from information sources 602 is compared to the information model, which functions in this example as a data dictionary. Then, common mediation layer 606 transforms the received information into a common representation and assigns the information to an appropriate entity (or entities) using the data dictionary. The assignment of the information is performed in accordance with a set of mapping rules in database 612. Rules engine 610 uses these mapping rules for comparing the received information to data describing managed entities represented by the information model, and then selecting a suitable entity (or entities) for the assignment.

Optionally, system 600 further includes "m" number of adaptation layers (e.g., for performing syntactic adaptation), where adaptation layers 604 are configured to optimize the interfacing of information sources 602 to common mediation layer 606. Here, one or more of information sources 602 are coupled to one of adaptation layers 604, where at least one of adaptation layers 604 serves as a bridge to connect sets of information sources 602 to common mediation layer 606. Adaptation layers 604 enable similar capabilities, behavior and characteristics of physical and/or logical entities to be grouped together so that the same process can be used to translate the information, as a group, into common mediation layer 606 for further processing. For example, consider two different private MIBs of information sources 602, such as "information source 1" and "information source 2," that are used to describe certain interface statistics for two different routers. If the router features are defined using common capabilities, then these interfaces statistics can be found to be the same. Thus, adaptation layer 620 ("adaptation layer 1") can be used to present each router's statistics to common mediation layer 606.

In one embodiment, each of the elements of system 600 is an interconnected module including software, hardware, or a combination thereof. In another embodiment, system 600 is implemented as middleware such that a new "instance model" can be generated based on the received information according to the knowledge contained in the information model. As an example, the instance model reflects the current state of managed entities for immediate use in a network.

Figure 7:
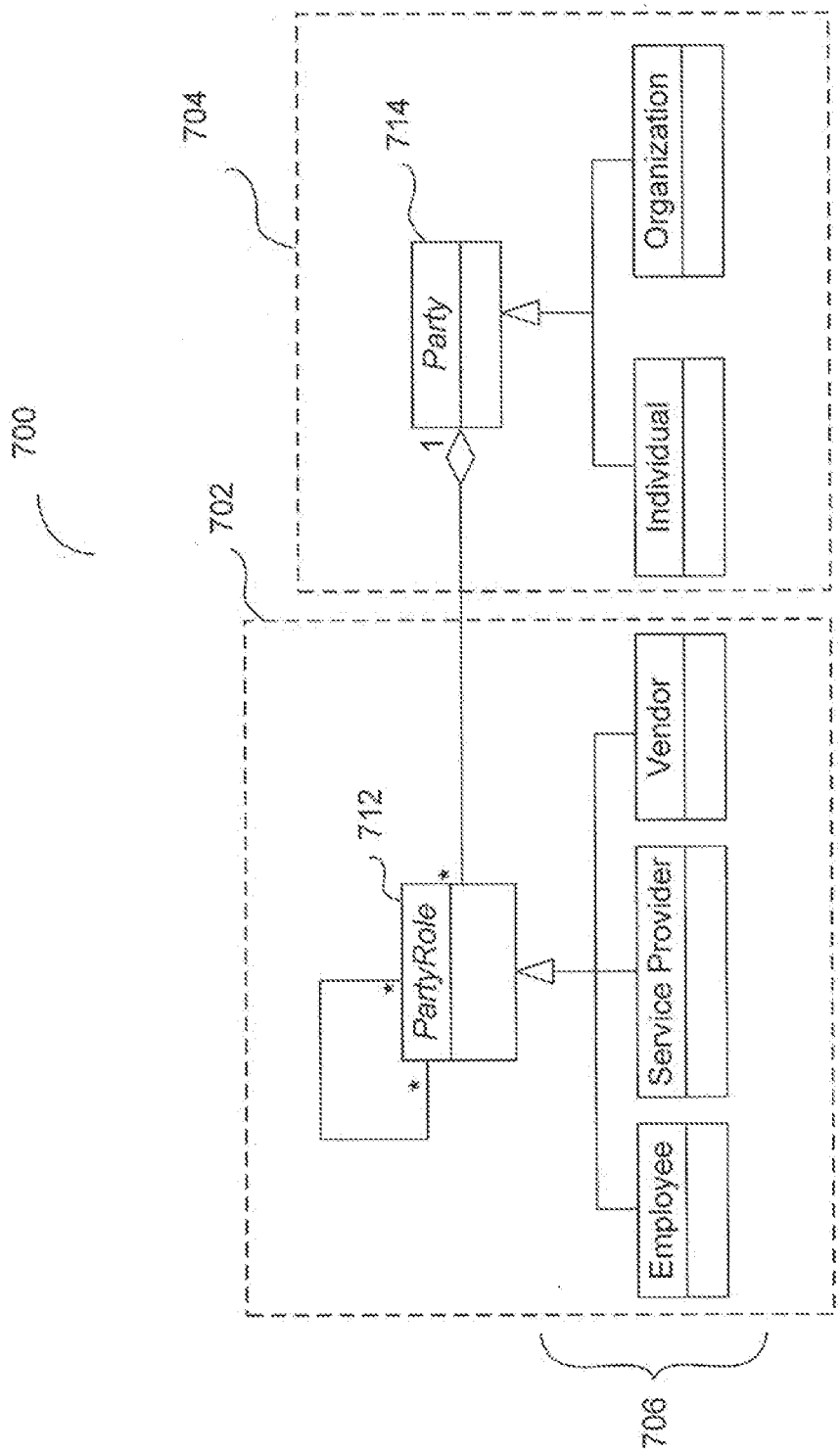
FIG. 7 is an exemplary model for representing a user according to one embodiment of the present invention.

FIG. 7 is an exemplary model for representing a user according to one embodiment of the present invention. In this instance, model 700 is independent of a repository and does not define how to enable the vendor-specific implementations. Rather, model 700 is a guide for vendor-independent implementation. Note that classes 706 of FIG. 7 are shown as an example only, and are not intended to be limiting. Model 700 can serve to represent a Party 714 as a container that can hold PartyRoles 712. Model 700 can also serve to represent Party 714 and PartyRole 712 as separate objects in model portions 704 and 702, respectively, which are related by an aggregation, for example, that connects them. In another embodiment, model 700 represents all or a portion of party model 580 of FIG. 5B.

But the actual implementation may vary depending how model 700 is viewed. That is, if Party 714 is viewed as a container that can hold PartyRoles 712, the user can be better represented in a directory, such as directory 408 of FIG. 4. This is because the directory excels at implementing containment relationships. By contrast, if model 700 is viewed as representing Party 714 and PartyRole 712 as separate objects, then is easier to implement model portions 704 and 702 in an RDBMS, since its strength is to be able to relate diverse information to each other. Therefore, although the directory and RDBMS implementations of model 700 are physically different, they can be related to each other because they are derived from the same information model. That is, if model 700 can be represented by information model 460 of FIG. 4, then a first data model describing Party 714 as a container holding PartyRoles 712 is preferably stored in directory 408, whereas a second data model describing Party 714 and PartyRole 712 as separate objects is preferably stored in database 410. Note that FIG. 7 represents a mere example of transforming data in vendor-independent form from an information model to the one or more repositories.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using XML, Java, C++, or other object-oriented programming language and development tools. Another embodiment of the invention may be implemented in hardwired circuitry in place of, or in combination with, machine-executable software instructions.

In conclusion, various illustrative embodiments of the invention provide, among other things, methods and systems for managing a computer network and obtaining information from different devices in a computer network. Those skilled in the art can readily recognize that numerous variations and substitutions may be made in the invention, its use, and its configuration to achieve substantially the same results as achieved by the embodiments described herein. For example, other access rights, such as "open," "execute," "move," etc., and other actions, such as synchronization of files and/or devices, one or more instructions of a command set, etc., can be used to supplement the enforcement of the security set definitions described herein. Accordingly, there is no intention to limit the invention to the disclosed exemplary forms. Many variations, modifications, and alternative constructions fall within the scope and spirit of the disclosed invention as expressed in the claims.

What is claimed is:

1. A computerized method for obtaining information from different devices in a computer network, the method comprising:
receiving data representing the information from each of the different devices, wherein the data is in a specific form relating to each of the different devices;
assigning the data from each of the different devices to one or more entities as defined by an information model, wherein each of the one or more entities of the information model is a device model that models a corresponding device within the computer network wherein the device model maps equivalent physical capabilities of different types of the corresponding device to a normalized representation of the physical capabilities in the corresponding device, and wherein the device model maps equivalent logical functions of different types of the corresponding device to each other; and
grouping the data from each of the different devices using an adaptation layer before assigning the data from that device to one or more entities.

2. The method of claim 1, wherein assigning the data further comprises:
preserving a semantic of the received data;
comparing received data against one or more managed entities; and
transforming the data into a common representation.

3. The method of claim 2, further comprising using the common representation of the data to monitor the performance of the network.

4. The method of claim 2, wherein transforming the data into a common representation is performed by a mediation layer.

5. The method of claim 2, wherein statistics associated with each of the different devices are provided by the adaption layer prior to the data being transformed into the common representation.

6. The method of claim 5, wherein the statistics are interface statistics indicating at least one of capabilities, behavior, or characteristics associated with each of the different devices.

7. The method of claim 1, wherein a set of mapping rules are used to assign the data from each of the different devices to the one or more entities and wherein the mapping rules control changes made to a state of each of the entities in the one or more entities.

8. A system for obtaining information from different devices in a computer network, the system comprising:
a processor;
a memory containing a plurality of program instructions configured to cause the processor to:
receive data representing the information from each of the different devices, wherein the data is in a specific form relating to each of the different devices;
assign the data from each of the different devices to one or more entities as defined by an information model, wherein each of the one or more entities of the information model is a device model that models a corresponding device within the computer network, wherein the device model maps equivalent physical capabilities of different types of the corresponding device to a normalized representation of the physical capabilities in the corresponding device, and wherein the device model maps equivalent logical functions of different types of the corresponding device to each other; and
group the data from each of the different devices using an adaptation layer before assigning the data from that device to one or more entities.

9. The system of claim 8, wherein the instructions to assign the data further cause the processor to:
preserve a semantic of the received data;
compare received data against one or more managed entities; and
transform the data into a common representation.

10. The system of claim 9, wherein the instructions further cause the processor to:
use the common representation of the data to monitor the performance of the network.

11. The system of claim 9, wherein transforming the data into a common representation is performed by a mediation layer.

12. The system of claim 9, wherein statistics associated with each of the different devices are provided by the adaption layer prior to the data being transformed into the common representation.

13. The system of claim 12, wherein the statistics are interface statistics indicating at least one of capabilities, behavior, or characteristics associated with each of the different devices.

14. The system of claim 8, wherein a set of mapping rules are used to assign the data from each of the different devices to the one or more entities and wherein the mapping rules control changes made to a state of each of the entities in the one or more entities.

15. A computer storage product comprising a computer readable storage device having a computer code stored therein, wherein the computer code, when executed on a computing device, causes the computing device to:
receive data representing the information from each of the different devices, wherein the data is in a specific form relating to each of the different devices;
assign the data from each of the different devices to one or more entities as defined by an information model, wherein each of the one or more entities of the information model is a device model that models a corresponding device within the computer network wherein the device model maps equivalent physical capabilities of different types of the corresponding device to a normalized representation of the physical capabilities in the corresponding device and wherein the device model maps equivalent logical functions of different types of the corresponding device to each other; and
group the data from each of the different devices using an adaptation layer before assigning the data from that device to one or more entities.

16. The computer storage product of claim 15, wherein the computer code to assign the data further causes the computing device to:
preserve a semantic of the received data;
compare received data against one or more managed entities; and
transform the data into a common representation.

17. The computer storage product of claim 16, wherein the computer code further causes the computing device to:
use the common representation of the data to monitor the performance of the network.

18. The computer storage product of claim 16, wherein transforming the data into a common representation is performed by a mediation layer.

19. The computer storage product of claim 16, wherein statistics associated with each of the different devices are provided by the adaption layer prior to the data being transformed into the common representation and wherein the statistics are interface statistics indicating at least one of capabilities, behavior, or characteristics associated with each of the different devices.

20. The computer storage product of claim 15, wherein a set of mapping rules are used to assign the data from each of the different devices to the one or more entities and wherein the mapping rules control changes made to a state of each of the entities in the one or more entities.

* * * * *